Patented June 21, 1949

2,473,880

UNITED STATES PATENT OFFICE 2,473,880

CLEANING METAL CATALYSTS WITH ALCOHOLIC CAUSTIC SOLUTION

Marion H. Gwynn, Mountain Lakes, N. J., assignor to Allied Chemical & Dye Corporation, New York, N. Y., a corporation of New York No Drawing. Application August 11, 1942, Serial No. 454,429

3 Claims. (Cl. 252—414)

1

This invention relates to catalysts and more particularly to cleaning catalysts employed in carrying out organic catalytic reactions.

In carrying out catalytic reactions, such as the vapor or liquid phase hydrogenation, dehydrogenation, hydrofining, disproportionation (simultaneous dehydrogenation and reduction reactions) or desulfurizing of organic compounds containing oxygen in the molecule, such as organic acids and particularly tar acids including phenol, cresol, xylenol and their homologs, the reactants are passed over catalysts arranged in converters, for example, as cages of metal particles having an active catalytic surface or non-metallic base material, such as pumice, having catalytically active material adherent thereto. In other such catalytic reactions, the catalyst and reactants are moved concurrently through a reaction zone. As the reaction proceeds, accumulations of organic material are deposited on the catalyst, catalyst cages and converter walls, and the catalyst loses its effectiveness so that it must be discarded or its effectiveness restored. Among the organic materials deposited on the catalyst are resinous materials resulting from the resinification of the reactants in the reaction zone. Resinous deposits are also formed during the roasting procedure frequently employed to effect reactivation of the catalyst. To restore catalyst effectiveness, it is necessary to remove the resin accumulations from the catalyst from time to time. It has been found, however, that resinous deposits are particularly resistant to solvent action and tend to form coke-like material when it is attempted to reactivate the catalyst by heating it.

It is an object of the invention to provide an improved procedure for the removal of resinous material from catalytic material employed in carrying out reactions such as those mentioned in the preceding paragraph. Another object of the invention is the conversion of catalytic metal sulfate to a catalytic metal hydroxide, particularly resin-embedded sulfate.

It is a further object of the invention to provide a novel process for restoring the effectiveness of spent hydrogenation catalysts contaminated with resinous materials. The expression "hydrogenation catalyst" is used herein in a broad sense to include catalysts employed for desulfurizing and dehydrogenating as well as hydrogenating organic materials. Other objects and advantages will appear hereinafter.

In accordance with the invention, deposits of resinous materials are removed from catalysts, such as nickel, copper, cobalt, platinum and palladium catalysts of the supported or unsupported, stationary or powdered type by treating the deposits with a solution of caustic alkali in an aliphatic alcohol or ketol. I preferably employ a hot alcoholic or ketolic solution of caustic alkali at a temperature within the range of from 150° to 300° C., ethylene glycol being utilized as the alcoholic solvent in the preferred embodiment of the invention. Alcohols and ketols boiling at atmospheric pressure below 150° C. may also be employed, in which case the solution is maintained under superatmospheric pressure sufficiently high to prevent undue volatilization of the solvent at the temperature employed for treating the catalyst. After treatment with the caustic alkali solution, the catalyst is washed with water to remove resinous material which has been rendered water soluble but not removed by the solution and may then be used without further treatment or may be subjected to reactivation, for example, by immersion in a solution of the nitrate of the catalytic metal, followed by decomposition of the nitrate.

I have found that treatment of resin-contaminated catalyst with alcoholic and ketolic solutions of caustic alkali renders the resinous deposits on the catalyst surprisingly soluble so that a portion of the resin is removed during the treatment with the solution and the remainder of the resin may be substantially completely removed by subsequently washing the catalyst with water. When the resin contamination is severe the treatment of the catalyst with alcoholic or ketolic solution of caustic alkali may be repeated. Furthermore, the catalyst may be cleaned without removal from the catalyst cages and in some cases without removal from the converters; when operating in this manner resinous deposits are removed from the cages and converters as well as from the catalyst.

It has recently been established that repeated use and reactivation of supported hydrogenation catalysts such as nickel, copper and cobalt catalysts by treating the spent catalyst with a solution of a salt such as the nitrate of the catalytic metal without removal of catalytic material from the support so that a plurality of accumulations of the catalytically active metal are successively deposited on the support results in unexpectedly superior catalysts. The invention expeditiously removes resin deposits from spent catalysts of the supported type without chemical attack on the catalyst or removal of spent catalytic material from the support and hence is particularly adapted to the preparation of highly effective reactivated catalysts.

Among the alcohols that may be employed in carrying out the invention are the aliphatic monohydroxy alcohols, aliphatic dihydroxy alcohols, and aliphatic trihydroxy alcohols. Examples of such alcohols are methanol, ethanol, propanol, butanol, pentanol, hexanol, and heptanol, ethylene glycol and other glycols, and glycerol and other trihydroxy aliphatic alcohols. Examples of ketols which may be employed are the simpler and more stable saturated ketols such as acetol, ethyl ketol, acetoin, diethyl methyl ketol, and diacetone alcohol. Preferably, saturated alcohols boiling within the range of 150° to 300° C. are utilized. Ethylene glycol is cheap, readily available and highly effective and is ordinarily employed in preference to other alcohols. In some cases the addition of other solvents may aid in cleaning the catalyst, e. g., where a solution of caustic alkali in methanol is utilized the addition of acetone to the solution aids in removal of the resin. As the caustic alkali, I may employ any of the alkali metal hydroxides, for example, sodium hydroxide, potassium hydroxide and lithium hydroxide, preferably in amounts from 1 to 20 per cent by weight based on the weight of the alcoholic or ketolic solvent.

As illustrative of the preferred embodiments of the invention, the following examples are given:

Example 1

A cage of nickel catalyst which had been prepared by filling with pelleted basic nickel carbonate supported on diatomaceous earth and decomposing the nickel carbonate by heating in air at a temperature of about 300° to 380° C. and which had become contaminated with phenolic resin during the vapor phase hydrogenation of phenol to produce cyclohexanol, was immersed for one-half hour in a hot ethylene glycol solution of sodium hydroxide containing about 9 per cent of sodium hydroxide based on the weight of the glycol and maintained at a temperature of about 150° C. After eliminating the moisture, the temperature was raised and maintained at about 190° C. for two hours. The catalyst was then removed from the ethylene glycol-sodium hydroxide solution and washed thoroughly with hot distilled water. A portion of the resin dissolved in the glycol-sodium hydroxide solution and the solution rendered the remainder of the resin water-soluble so that substantially all of the remainder of the resin was removed during the subsequent wash with water.

Example 2

A cage of resin-contaminated pumice-base nickel catalyst prepared by immersing pumice particles about ⅛ to ¼ inch in diameter in a concentrated solution of nickel nitrate and decomposing the nitrate by heating the particles in air to a temperature of about 300° to 380° C., which had become contaminated with resinous material during the vapor phase hydrogenation of mixed cresols, was immersed for one hour in an ethylene glycol solution of sodium hydroxide containing 5 per cent by weight of sodium hydroxide and maintained at a temperature of about 190° C. The catalyst was removed and washed with hot distilled water. It was found that the resinous accumulations on the catalyst were substantially completely removed.

Example 3

Spent resin-contaminated nickel hydrogenation catalyst similar to the catalyst of Example 2 was washed successively with a hot ethylene glycol solution of sodium hydroxide and hot water as described in Example 2. The catalyst was then reactivated by immersing it in a concentrated solution of nickel nitrate. The nickel nitrate was decomposed to produce catalytically active nickel oxide by heating the catalyst in air at a temperature of from about 300° to 380° C.

Catalysts cleaned in accordance with the above examples were successfully employed for various vapor phase reactions such as the hydrogenation of phenol to produce cyclohexanols, hydrogenation of cresols to produce methylcyclohexanols, hydrogenation of xylenols to produce dimethylcyclohexanols, dehydrogenation of cyclohexanol and methylcyclohexanol to produce cyclohexanone and methylcyclohexanone, and also the hydrogenation of liquid condensation products of aldehydes or ketones.

As aforementioned, if the catalyst possesses sufficient activity after removal of resin contaminations, it may be employed without further treatment. If, however, as is frequently the case, it is desired to restore further the activity of the catalyst, it may be subjected to any desired reactivation procedure, for example, immersion in a solution of the nitrate of the catalytic metal followed by decomposition of the nitrate; metal base catalysts such as nickel catalysts may be reactivated by anodic oxidation, nitration with nitric acid vapors and decomposition of the resultant nitrate coating, treatment with an oxalic acid solution to produce an adherent layer of the metal oxalate on the catalyst followed by decomposition of the oxalate layer, oxidation with an aqueous solution of a halite such as sodium chlorite, or oxidation with an alkaline solution of alkali metal hypohalite such as hypobromite. If reactivation is effected by acid treatment of the spent catalyst, the residual caustic alkali left on the catalyst during the resin removal may be neutralized by dipping the catalyst for a short period in a dilute solution of acid such as oxalic acid at or near the end of the water-washing step.

Resin-contamination of the catalyst may occur more quickly in some portions of the reaction zone than in others. For example, in the vapor phase hydrogenation of tar acids in a train of catalyst converters connected in series, the catalyst in the neighborhood of the inlet end of the reaction zone where the concentration of tar acid vapor is the highest is particularly subject to contamination with resin. In such cases it is frequently necessary to remove resin only from the catalyst near the inlet of the reaction zone; the remainder of the catalyst may be shifted toward the inlet end and fresh catalyst introduced at the outlet end of the zone. Where resin accumulation is relatively slow, removal of the resin is necessary only after several cycles of reactivation and use of the catalyst.

In some cases, when the reactants contain sulfur, resin contamination of the catalyst is accompanied by formation of the sulfate of the catalytic metal embedded in the resin deposits. In such cases, cleaning the catalyst in accordance with the invention not only removes the resinous deposits but converts at least a portion of the sulfate of the catalytic metal to the hyroxide of the metal and thus aids in removing sulfur poison and facilitates reactivation of the catalyst.

It will be noted that this invention provides an efficient and simple method for cleaning supported and unsupported catalysts of the stationary and powdered types employed in hydrogenation, dehydrogenation, hydrofining, desulfurizing, disproportionation vapor or liquid phase reactions of organic reactants containing oxygen in the molecule particularly organic acids and still more particularly tar acids, in which reactions it has been found a resinous deposit, exceedingly difficult to remove by procedures known prior to my invention, forms on the catalyst.

Since certain changes may be made without departing from the scope of the invention, it is intended that the above shall be interpreted as illustrative and not in a limiting sense.

What is claimed is:

1. The process of removing from cages of spent hydrogenation catalyst of the group consisting of nickel catalyst, copper catalyst and cobalt catalyst, resinous material deposited on the catalyst while catalyzing a reaction of the group consisting of hydrogenation, dehydrogenation, hydrofining, disproportionation and desulfurization of organic compounds containing oxygen in the molecule, which comprises immersing the cages of resin-contaminated catalyst in a solution of caustic soda in ethylene glycol at a temperature within the range of 150° C. to 300° C., said solution containing from 1 per cent to 20 per cent by weight of caustic soda, and then washing the catalyst with water.

2. In the process involving repeatedly using supported nickel hydrogenation catalyst to effect vapor phase hydrogenation of phenolic material and reactivating the catalyst by treating it with nickel nitrate solution and decomposing the nitrate, the improvement which comprises cleaning the catalyst to remove phenolic resinous deposits therefrom after use and prior to reactivation by treating the catalyst with an ethylene glycol solution of caustic soda at a temperature within the range of 150° to 300° C. to render the resinous deposits water-soluble, and washing the catalyst with water.

3. The process of removing from spent hydrogenation catalyst of the group consisting of nickel catalyst, copper catalyst and cobalt catalyst, resinous material deposited on the catalyst while catalyzing a reaction of the group consisting of hydrogenation, dehydrogenation, hydrofining, disproportionation and desulfurization of organic compounds containing oxygen in the molecule, which comprises immersing said catalyst in a solution of caustic soda in a solvent selected from the group consisting of a liquid aliphatic alcohol and a liquid aliphatic ketol said solution containing from 1 per cent to 20 per cent by weight of caustic soda and being at a temperature within the range of 150° C. to 300° C., and then washing the catalyst with water.

MARION H. GWYNN.

REFERENCES CITED

The following references are of record in the file of this patent:

UNITED STATES PATENTS

| Number | Name | Date |
|---|---|---|
| Re. 21,448 | Byrkit | May 14, 1940 |
| 533,666 | Pfaffle et al. | Feb. 5, 1895 |
| 974,749 | Caulfield | Nov. 1, 1910 |
| 1,085,100 | Baekland | Jan. 27, 1914 |
| 1,770,166 | Bent | July 8, 1930 |
| 1,823,127 | Schmidt et al. | Sept. 15, 1931 |
| 1,945,215 | Buell | Jan. 30, 1934 |
| 2,020,411 | Greer | Nov. 12, 1935 |
| 2,082,519 | Ruthruff | June 1, 1937 |
| 2,191,464 | Gwynn | Feb. 27, 1940 |
| 2,259,961 | Myddleton | Oct. 21, 1941 |

FOREIGN PATENTS

| Number | Country | Date |
|---|---|---|
| 482,549 | Great Britain | Mar. 31, 1938 |
| 304,341 | Germany | Oct. 27, 1920 |
| 416,451 | Germany | July 16, 1925 |

OTHER REFERENCES

Sabatoer, "Catalysis in Organic Chemistry," Published by D. Van Nostrand Co., New York, (1922) Page 344.

Ellis, "The Chemistry of Synthetic Resins," Vol. 2, pages 1126 and 1133, (1935), also Vol. 1, page 328, Reinhold Publishing Co., N. Y.

"Handbook of Chemistry and Physics" 21st Edition, page 1899, (1936–7).

"Scott's Standard Methods of Chemistry Analysis," 5th Edition, Vol. 1, page 1219, (1939), published by D. Van Nostrand Co., New York.